(12) United States Patent
Gonigman et al.

(10) Patent No.: US 8,607,763 B2
(45) Date of Patent: Dec. 17, 2013

(54) METHOD AND SYSTEM FOR INTERNAL COMBUSTION ENGINE

(76) Inventors: Itzhak Gonigman, Maalot (IL); Moshe Sinai, Herzliya (IL)

(*) Notice: Subject to any disclaimer, the term of this patent is extended or adjusted under 35 U.S.C. 154(b) by 696 days.

(21) Appl. No.: 12/779,094

(22) Filed: May 13, 2010

(65) Prior Publication Data

US 2011/0277711 A1    Nov. 17, 2011

(51) Int. Cl.
   *F02B 19/02*    (2006.01)
(52) U.S. Cl.
   USPC .......................................... 123/292
(58) Field of Classification Search
   USPC ........ 123/286, 292, 293, 188.2, 79 R, 84–87, 123/315
   See application file for complete search history.

(56) References Cited

U.S. PATENT DOCUMENTS

| | | | | |
|---|---|---|---|---|
| 1,849,347 A | * | 3/1932 | Dale | ............................. 60/39.6 |
| 2005/0087158 A1 | * | 4/2005 | Tanei | ......................... 123/90.15 |

FOREIGN PATENT DOCUMENTS

| | | | | | |
|---|---|---|---|---|---|
| DE | 3608925 A1 | * | 10/1987 | ................ | F01L 1/28 |
| DE | 10159844 A1 | * | 9/2003 | ................ | F01L 1/28 |
| GB | 2361031 A | * | 10/2001 | ................ | F01L 1/28 |
| JP | 01036905 A | * | 2/1989 | ................ | F01L 1/28 |
| WO | WO2004/001197 A1 | * | 12/2003 | ................ | F01L 1/28 |

* cited by examiner

*Primary Examiner* — Hung Q Nguyen
(74) *Attorney, Agent, or Firm* — Mark M. Friedman

(57) ABSTRACT

It is provided an improved internal combustion engine unit. The engine unit has a piston moving in a cylinder enclosing cylinder volume, an intake valve controlling closing and opening of an intake aperture connecting the cylinder volume to an intake manifold, and an exhaust valve controlling closing and opening of an exhaust aperture connecting the cylinder volume to an exhaust manifold. The improved engine unit includes a separating aperture between the cylinder and a separation chamber, and a separating valve adapted for controlling closing and opening the separating aperture. The separation chamber is connectable to the intake manifold and to the exhaust manifold, respectively, by the intake and exhaust apertures. Opening both the separating valve and the exhaust valve enables gas flow from the cylinder volume to the exhaust manifold through the open separating aperture, the separation chamber and the open exhaust aperture. Opening both the separating valve and the intake valve enables gas flow from the intake manifold to the cylinder volume through the open intake aperture, the separation chamber and the separating aperture. The intake valve and the exhaust valve are driven by solenoids controlled in turn by an engine computer. The separating valve is driven by a camshaft driven in turn by the engine.

12 Claims, 6 Drawing Sheets

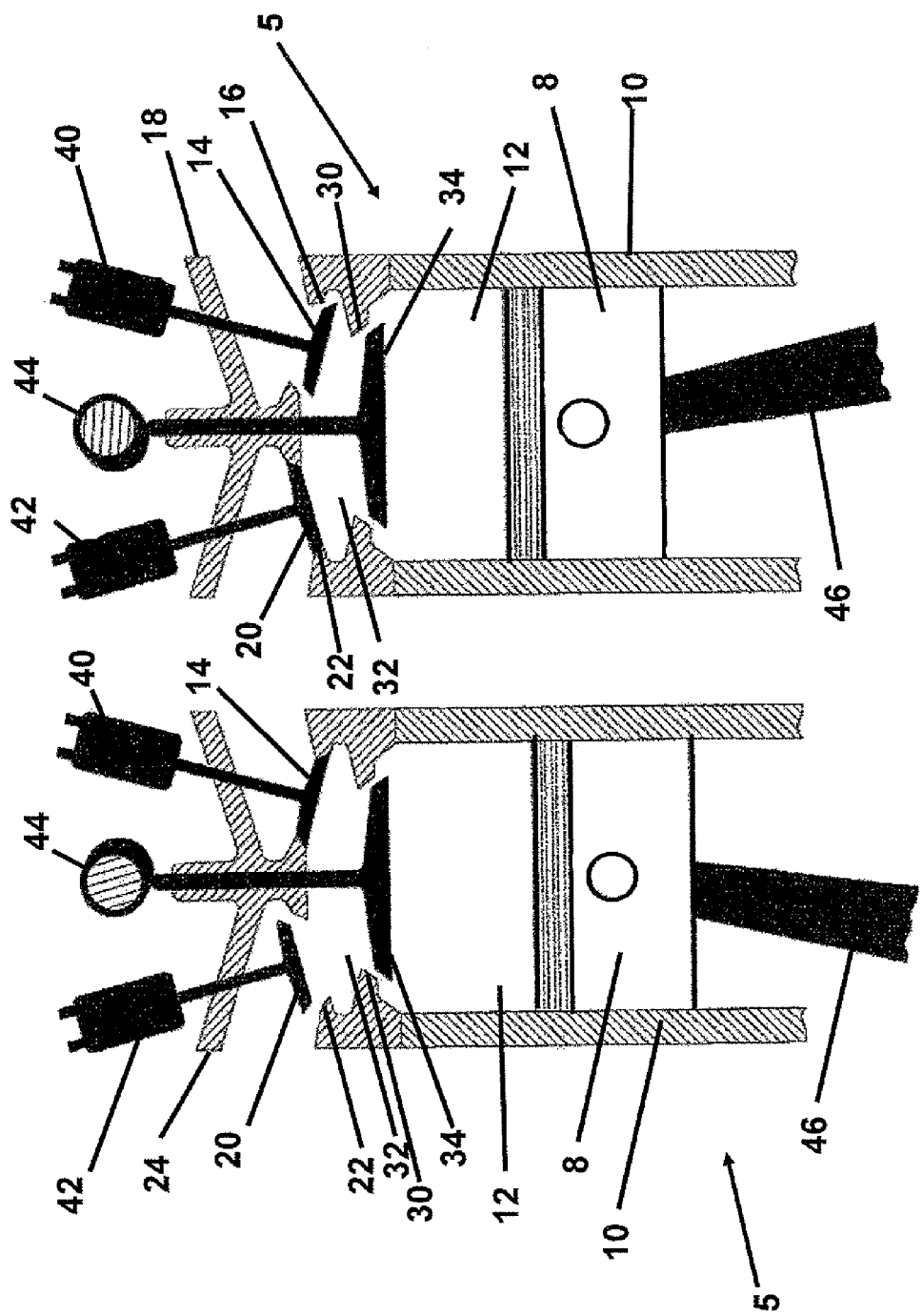

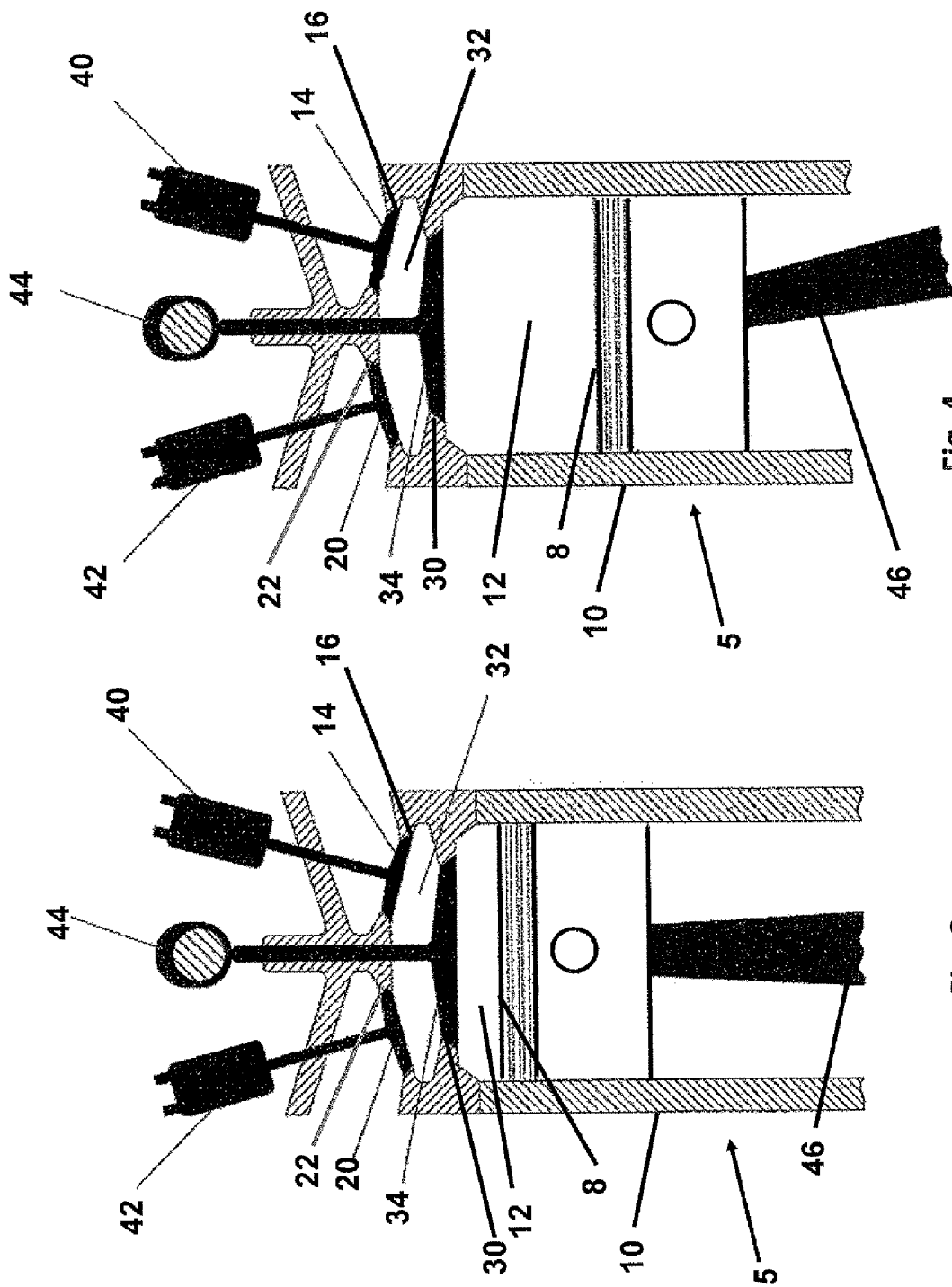

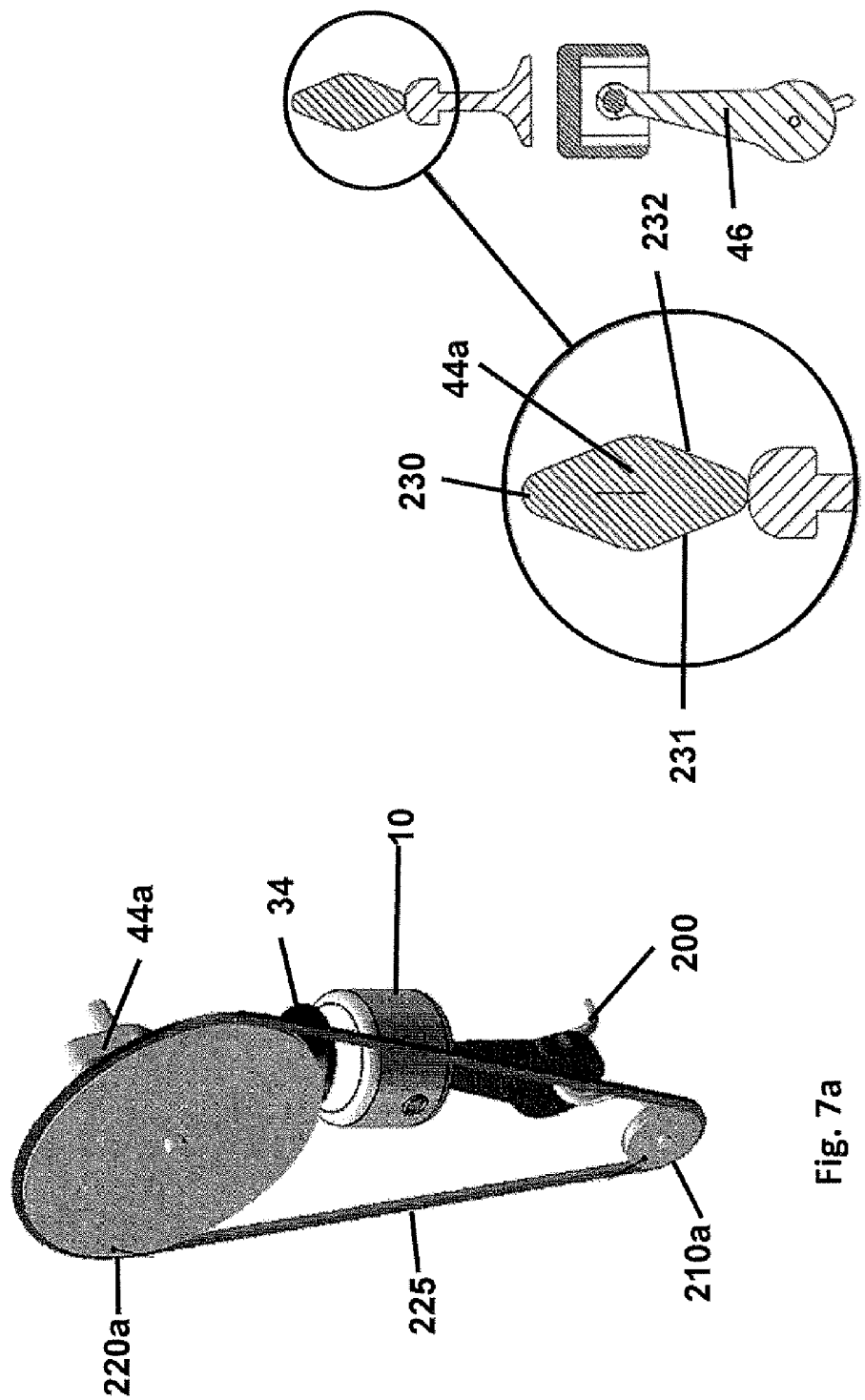

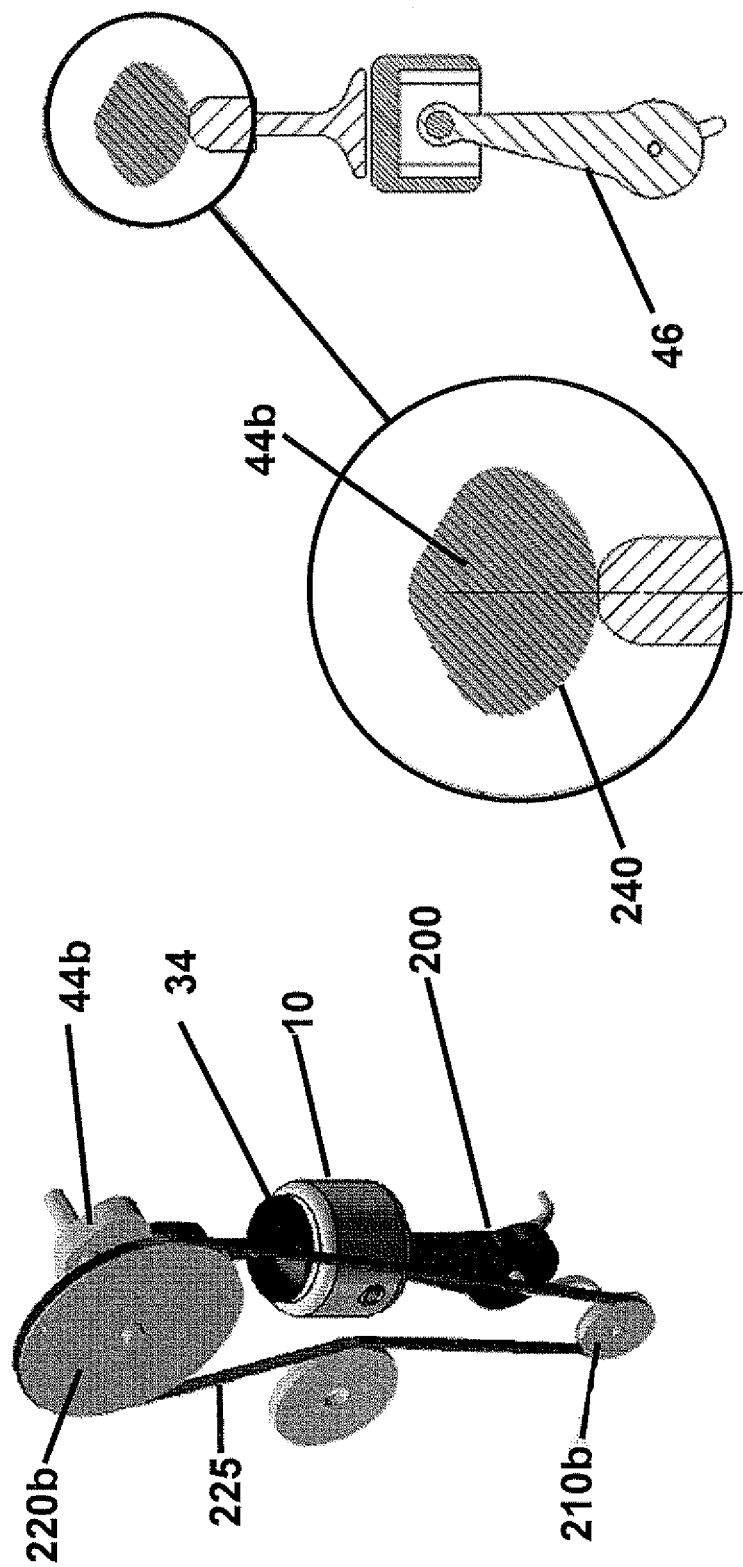

METHOD AND SYSTEM FOR INTERNAL COMBUSTION ENGINE

BACKGROUND OF THE INVENTION

1. Field of the Invention

The invention is in the field of internal combustion engines, and in particular deals with an improved engine having a separation chamber for the intake and exhaust apertures and valves.

2. Description of Related Art

The internal combustion engine (ICE) is an engine in which the combustion of a fuel, fossil fuel for example, occurs with an oxidizer, usually air, in a combustion chamber. In an internal combustion engine high temperature and high pressure gases are produced by the combustion. The gas expansion applies force to a movable component of the engine, such as the piston, and by moving the moveable component over a distance, generate useful mechanical energy.

The term internal combustion engine usually refers to an engine in which combustion is intermittent, such as the familiar four-stroke and two-stroke piston engines. A second class of internal combustion engines use continuous combustion, gas turbines, jet engines and most rocket engines. While there are many stationary applications of ICEs, the real strength of ICEs is in mobile applications and they dominate as a power supply for cars, aircraft, and boats of all sizes.

Referring to a four-stroke ICE, the four strokes are intake, compression, combustion, and exhaust strokes that occur during two crankshaft rotations per working cycle of a gasoline engine or a diesel engine.

The cycle begins when a piston slidable inside a cylinder is farthest away from the axis of the crankshaft. On the intake stroke of the piston, the piston descends from the top of the cylinder, reducing the pressure inside the cylinder. A mixture of fuel and air is forced by atmospheric pressure into a cylinder through the intake port or aperture. An intake valve then closes, and the compression stroke compresses the fuel-air mixture.

The air-fuel mixture is then ignited near the end of the compression stroke, usually by a spark plug for a gasoline or Otto cycle engine or by the heat and pressure of compression, for a Diesel cycle engine. The resulting pressure of burning gases pushes the piston through the power stroke. In the exhaust stroke, the piston pushes the products of combustion from the cylinder through an exhaust port or aperture. The exhaust valve then closes, and the intake stroke takes place again.

Usually, the intake and exhaust valves are driven by a camshaft rotating once per four-stroke cycle, while the crankshaft rotates twice per four-stroke cycle. Recently, there are numerous designs for operating the intake valve and the exhaust valve using solenoids, which are driven by an engine controller or computer.

The intake and exhaust valves are exposed to the large pressures developed in the combustion chamber or cylinder during the compression and combustion strokes. Thus, it may be advantageous to reduce that pressure and isolate the intake and exhaust apertures from the main body of the combustion chamber during the compression and combustion strokes.

BRIEF SUMMARY OF THE INVENTION

It is provided according to some embodiments of the preset invention, an improved internal combustion engine unit. The engine unit has a piston moving in a cylinder enclosing cylinder volume, an intake valve controlling closing and opening of an intake aperture connecting the cylinder volume to an intake manifold, and an exhaust valve controlling closing and opening of an exhaust aperture connecting the cylinder volume to an exhaust manifold. The improved engine unit includes a separating aperture between the cylinder and a separation chamber, and a separating valve adapted for controlling closing and opening the separating aperture. The separation chamber is connectable to the intake manifold and to the exhaust manifold, respectively, by the intake and exhaust apertures. Opening both the separating valve and the exhaust valve enables gas flow from the cylinder volume to the exhaust manifold through the open separating aperture, the separation chamber and the open exhaust aperture. Opening both the separating valve and the intake valve enables gas flow from the intake manifold to the cylinder volume through the open intake aperture, the separation chamber and the separating aperture.

In some embodiments, the intake valve and the exhaust valve are driven by electrical mechanisms.

In some embodiments, the separating valve is driven by a camshaft. The camshaft is associated to a crankshaft at a first ratio of camshaft rotations to crankshaft rotations, 1:4 or 1:3, for example. The camshaft provides a second ratio of separating valve openings to camshaft rotations, 2:1, for example.

In some embodiments, the ratio of the volume of the separation chamber to full cylinder volume is in the range of 5-20%.

In some embodiments, the pressure in the separation chamber during the intake stroke is kept below 0.25 bar.

In some embodiments, the engine unit is associated with sensors. The sensors deliver indications of the engine unit operational parameters to a control means effecting operation of the intake valve and the exhaust valve.

In some embodiments, the diameter of the separating valve is in the range of 65-95% of internal diameter of the cylinder, preferably 70-85% of internal diameter of the cylinder.

In some embodiments, the engine has two or more separating apertures, as well as respective two or more separating valves.

In some embodiments, the separating valve is open since the valve exhaust opens until the intake valve closes.

It is provided according to some embodiments of the present invention, a method for operating the improved internal combustion engine unit. The method includes opening the separating valve, and while the separating valve is open, opening the exhaust valve, enabling combusted gas flow from the cylinder volume to the exhaust manifold through the open separating aperture, the separation chamber and the open exhaust aperture, closing the exhaust valve for stopping the combusted gas flow, and opening the intake valve, enabling gas flow from the intake manifold to the cylinder volume through the open intake aperture, the separation chamber, and the open separating aperture. The method also includes closing the intake valve and closing the separating valve for stopping gas flow from the intake manifold. Thereby, the separation chamber is kept isolated from the cylinder volume during compression and combustion strokes, and the intake manifold and the exhaust manifold are kept doubly isolated of from the cylinder volume during compression and combustion strokes.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

FIG. 1 is a schematic drawing of an improved engine unit during the exhaust stroke.

FIG. 2 is a schematic drawing of an improved engine unit during the intake stroke.

FIG. 3 is a schematic drawing of an improved engine unit during the compression stroke.

FIG. 4 is a schematic drawing of an improved engine unit during the combustion stroke.

FIG. 7a is an isometric view of a crankshaft rotating a pulley system at 1:4 rate for rotating a camshaft opening and closing a separating valve.

FIG. 7b is a sectional view of the crankshaft of FIG. 7a.

FIG. 8a is an isometric view of a crankshaft rotating a pulley system at 1:3 rate for rotating a camshaft opening and closing a separating valve.

FIG. 8b is a sectional view of the crankshaft of FIG. 8a.

DETAILED DESCRIPTION OF THE INVENTION

Figure 5:
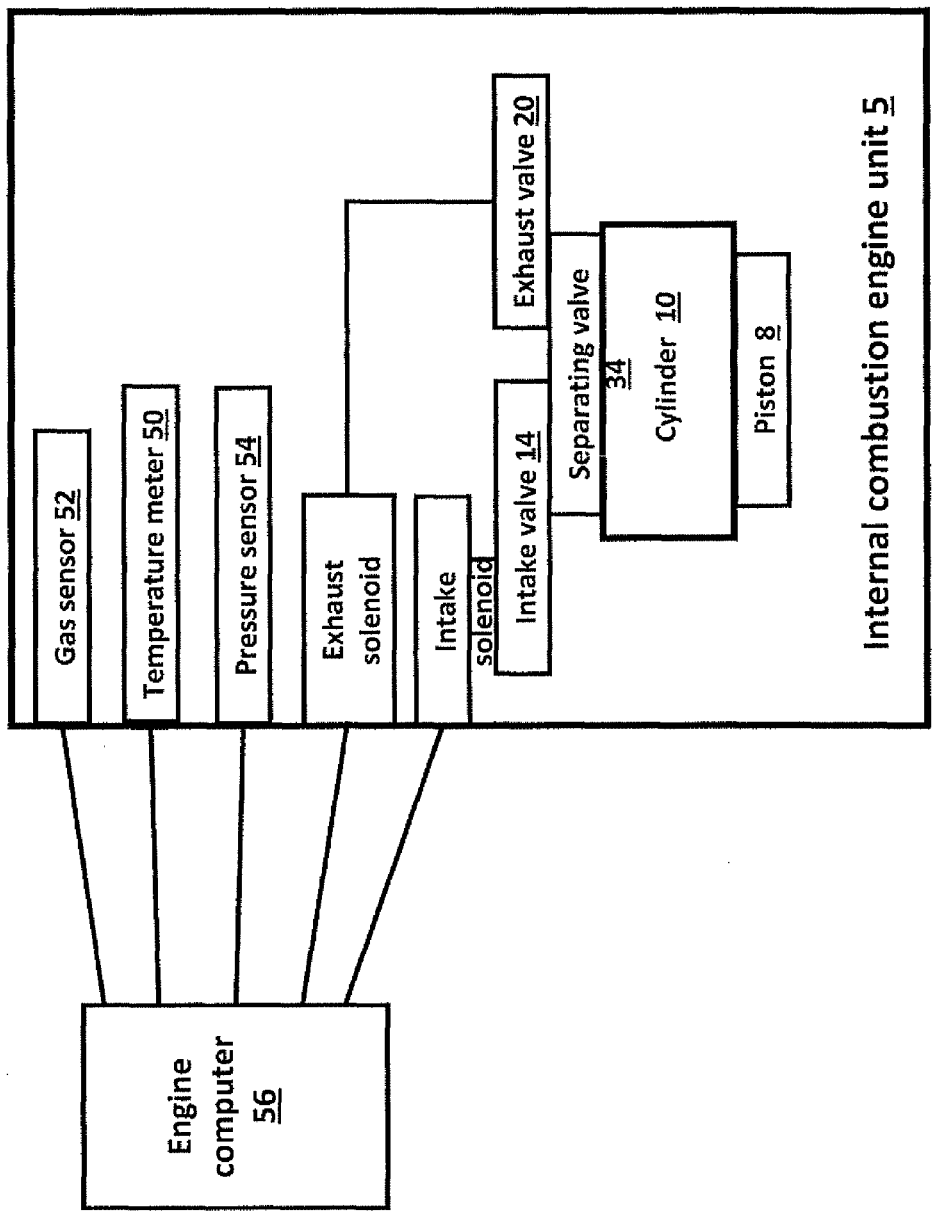
FIG. 5 is a block diagram of an improved engine unit which includes a plurality of sensors.

The present invention will now be described in terms of specific example embodiments. It is to be understood that the invention is not limited to the example embodiments disclosed. It should also be understood that not every feature of the methods and systems handling the described engine unit is necessary to implement the invention as claimed in any particular one of the appended claims. Various elements and features of the engine unit are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

An improved internal combustion engine unit 5 according to some embodiments is presented in FIGS. 1-4, during the four strokes of operation. The engine unit 5 has a piston 8 moving in a cylinder 10 enclosing cylinder volume 12, and an intake valve 14 controlling closing and opening of an intake aperture 16, connecting the cylinder volume 12 to an intake manifold 18. It also has an exhaust valve 20 controlling closing and opening of an exhaust aperture 22, connecting the cylinder volume 12 to an exhaust manifold 24.

The improved engine unit 5 includes a separating aperture 30 between the cylinder 10 and a separation chamber 32, and a separating valve 34 adapted for controlling closing and opening the separating aperture 30. Separation chamber 32 is connectable to intake manifold 18 and to exhaust manifold 24, respectively, by intake aperture 16 and exhaust aperture 22.

During the exhaust stroke, illustrated in FIG. 1, both separating valve 34 and exhaust valve 20 are open, and consequently combusted gas flows from cylinder volume 12 to exhaust manifold 24 through open separating valve 34, separation chamber 32 and open exhaust aperture 22.

During the consequent intake stroke, both separating valve 34 and intake valve 14 are open, and consequently fresh air flows from intake manifold 18 to cylinder volume 12 through open intake valve 14, separation chamber 32 and separating aperture 30.

Intake valve 14 and exhaust valve 20 are driven by a solenoid 40 and a solenoid 42, respectively. The separating valve 34 is driven by a camshaft 44 which rotates at half the rotation rate of a crankshaft driving piston 8 by connecting rod 46. Due to some eccentricity of camshaft 44, it pushes separating valve 34 towards the piston during the intake and exhaust strokes, while during the compression and combustion strokes the highly pressurized gas in the cylinder volume 12 push the separating valve 34 towards separating aperture 30. A spring may be used to better control the switching between the open and close states of the separating valve.

In some embodiments, the ratio of the volume of separation chamber 32 to full cylinder volume is in the range of 5-20%. Here, the volume of separation chamber 32 is defined as the volume enclosed by the walls of separation chamber 32 and by intake aperture 16, exhaust aperture 22 and separating aperture 30 while being closed by the respective valves 14, 20 and 34. Cylinder volume 12 is defined as the volume enclosed by the cylinder internal wall, piston 8 while closest to the crankshaft, and separating aperture 30 while being closed by separating valve 34.

One advantage of improved engine unit 5 comparing to a conventional engine unit is that the exhaust and intake apertures and valves are exposed to a lower maximal pressure as the separating valve prevents exposure to the high pressures in the cylinder volume 12 during the compression and combustion strokes. For example, in one embodiment of the pressure in the separation chamber 32 is kept below 6 bar, comparing to pressures as high as 60 bar developed in a conventional engine unit of the same cylinder volume.

Referring now to FIG. 5, engine unit 5 may include a variety of sensors. Exemplary sensors are temperature meter 50, gas sensor 52 and pressure sensor 54. The sensors deliver indications of the engine unit operational parameters to a control means, engine computer 56 for example. The control means 56 controls solenoids 40 and 42, respectively, and thus effects operation of intake valve 14 and exhaust valve 20. The sensors may be located in a variety of locations within the engine unit, cylinder volume 12, separating chamber 32 and coolant, for example.

Figure 6:
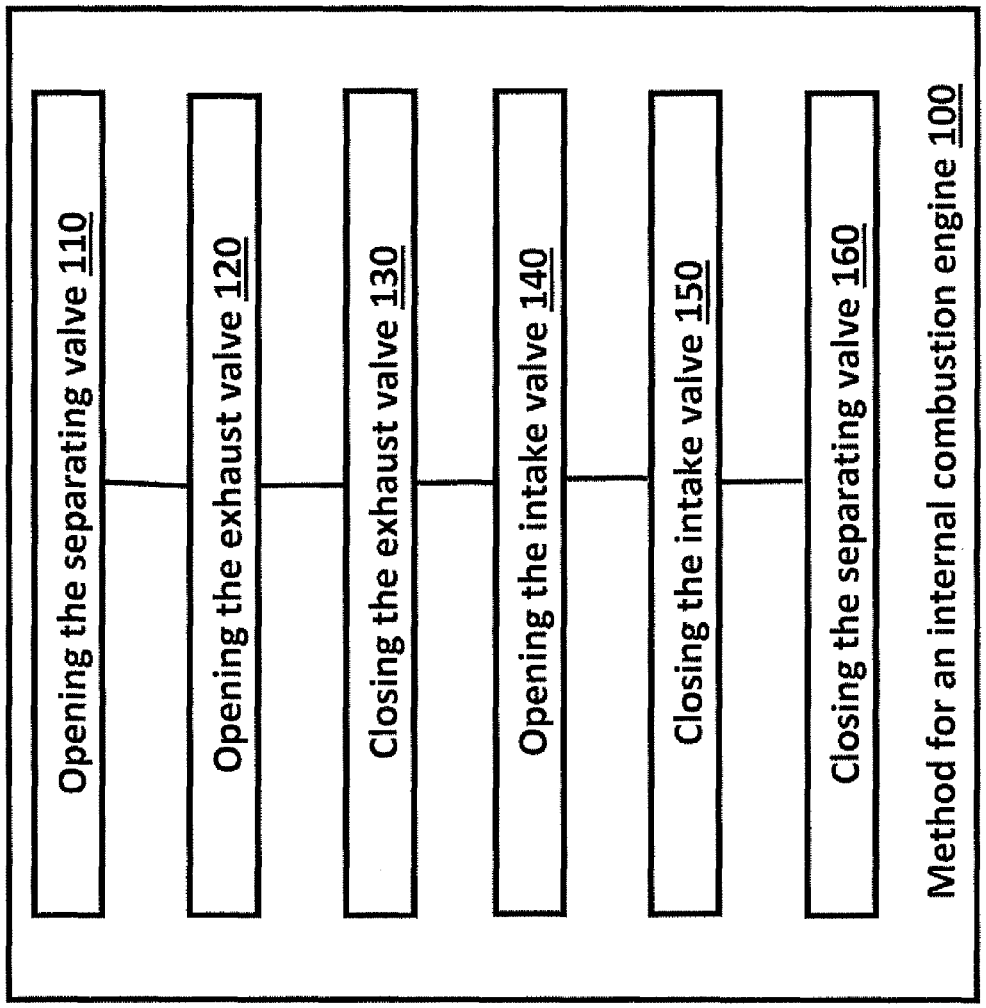
FIG. 6 is a flow chart of a method for operating an improved engine unit.

FIG. 6 illustrates a flow chart of a method 100 for operating improved internal combustion engine unit 5 according to some embodiments of the present invention. Method 100 includes step 110 of opening the separating valve 34, and step 120 of opening the exhaust valve 20, enabling combusted gas flow from the cylinder volume 12 to the exhaust manifold 24 through the open separating aperture 30, the separation chamber 32 and open exhaust aperture 22. Method 100 also includes step 130 of closing exhaust valve 20 for stopping the combusted gas flow, and step 140 of opening intake valve 14, enabling gas flow from intake manifold 18 to the cylinder volume 12 through open intake aperture 16, separation chamber 32, and open separating aperture 30. Method 100 further includes closing the intake valve 14 and closing separating valve 34 for stopping gas flow from intake manifold 18. Thereby, separation chamber 32 is isolated from the cylinder volume 12 during compression and combustion strokes. Furthermore, the intake manifold and the exhaust manifold are doubly isolated from the high pressure cylinder volume 12 during compression and combustion strokes.

Referring now to FIGS. 7 and 8, separating valve 34 is driven by a camshaft, camshaft 44a in FIGS. 7a, and 7b, and camshaft 44b in FIGS. 8a, and 8b. Camshafts 44a and 44b are associated with a crankshaft 200 at a first ratio of camshaft rotations to crankshaft rotations, ratio 1:4 in FIG. 7a and ratio 1:3 in FIG. 8a, by a pulley system. The pulley system of FIGS. 7a-d includes a primary wheel 210a and a secondary wheel 220a interconnected by a timing belt 225, whereas the ratio of the perimeter of primary wheel 210a to the perimeter of secondary wheel 220a is 1:4. The pulley system of FIG. 8a-d includes a primary wheel 210b and a secondary wheel 220b interconnected by a timing belt 225, whereas the ratio of the perimeter of primary wheel 210b to the perimeter of secondary wheel 220b is 1:3.

Dealing now with a second ratio of separating valve closings to camshaft rotations, camshaft 44a, having two opposing peaks, and thus provides a 2:1 ratio. In contrast, camshaft 44b has only one peak and thus provides a 1:1 value for the second ratio. Camshafts 44a and 44b differ also by shape of the peak, wherein the shape of the peak determines the duration of opening separating aperture 30 by separating valve 34. In camshaft 44a, two sides 231 and 232 of peak 230 have an acute angle in between, and thus opening time is short. In contrast, the opening side 240 of camshaft 44b is shaped as an arc of about 180°, leaving separating valve 34 open accordingly.

An exemplary conventional engine rotates 4000 revolutions per minute(rpm) works with a camshaft rotating at 2000. In contrast, with two peaks camshaft, the camshaft should rotate only 1000 rpm, thus decreasing power loss and load on the engine and on the camshaft.

Referring now to a third ratio of separating valve closings to crankshaft rotations, it is the product of the first ratio of camshaft rotations to crankshaft rotations and the second ratio of separating valve closings to camshaft rotations. In the example of FIG. 7 the third ratio is 1:2, while in the example of FIG. 8 the ratio is 1:3. Note that the shaping of the camshaft and the determination of timing belt ratio provides a continuous variety of possibilities regarding the value of third ratio. With the exemplary aforementioned values, the range of the third values is between 1:4 and 2:3.

With a third ratio of 1:3, the engine may be designed to include additional two strokes of intake and exhaust without combustion to get rid of remaining burned gases, and to cool down the separation chamber.

In some embodiments, the engine has two or more separating apertures, as well as respective two or more separating valves. In such a design, each separating valve is lighter.

The ability to have an electronic control of the intake valve, in conjunction with the separating valve, may have practical effect on the engine efficiency. Note that a compression ratio of an internal-combustion engine represents the ratio of the volume of its combustion chamber and cylinder from its largest capacity to its smallest capacity. In a piston engine it is the ratio between the volume of the cylinder and combustion chamber when the piston is at the bottom of its stroke, and the volume of the combustion chamber when the piston is at the top of its stroke. In an exemplary 1920 cc engine of four cylinders the piston is at the bottom of its stroke containing 480 cc of air (430 cc in the cylinder plus 50 cc in the combustion chamber). When the piston has moved up to the top of its stroke inside the cylinder, and the remaining volume inside the head or combustion chamber has been reduced to 50 cc, and the compression ratio an ideal ratio of 9.6:1.

A high compression ratio allows an engine to extract more mechanical energy from a given mass of air-fuel mixture due to its higher thermal efficiency. High ratios place the available oxygen and fuel molecules into a reduced space along with the adiabatic heat of compression, causing better mixing and evaporation of the fuel droplets. Thus, they allow increased power at ignition and the extraction of more useful work from that power by expanding the hot gas to a greater extent.

The amount of air entering the cylinder in the intake stroke affects the engine efficiency much alike the compression ratio. For example, suppose that an engine 9.6:1 compression ratio is designed to be filled with air at 1.0 bar in the end of the intake valve, and is actually filled with air at 0.8 bar. Then, upon compression the pressure of the air-fuel mixture is like that of a 8:1 compression ratio engine. Such an actual low compression ratio occurs in high revolution rate as the intake valve is not open enough time to allow the internal air pressure to be equal to the external air pressure.

To avoid a change of the air pressure at the end of intake stroke, the engine may be designed for high compression ratio and the control of the intake valve may be used to change the opening time of the intake valve in conjunction with the separating valve, such that the amount of air entering the cylinder is constant without dependence on the engine revolution rate. In other words, in low revolution rate, the intake valve is closed earlier than normal to let less air enter the cylinder. In contrast, in high revolution rate, the intake valve is kept open more time such that the air amount is like in low revolution rate.

For example, the above mentioned 480 cc cylinder is designed with a combustion chamber of 40 cc, such that the compression ratio is 12:1, higher than an ideal compression ratio. In low revolution rate, the intake valve is limited to take a partial 80% pressure (i.e. 0.8 bar) and the additional 20% comes from retrieval of exhaust gases. Thus, the actual compression ratio is 9.6:1. In high revolution rate, the intake valve is not limited at all, or at least is limited to much less extent, such that the actual compression ratio is again 9.6:1.

Alternatively, at low revolution rate, the exhaust valve is used in the beginning of the compression stroke to release 20% of the air, such that the actual compression ratio is kept at 9.6:1. In high revolution ratio, no use or almost no use is made of the exhaust valve for releasing air of the cylinder during the compression stroke.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. An improved internal combustion engine unit, the engine unit having a piston moving in a cylinder enclosing cylinder volume, an intake valve controlling closing and opening of an intake aperture connecting the cylinder volume to an intake manifold, and an exhaust valve controlling closing and opening of an exhaust aperture connecting the cylinder volume to an exhaust manifold, the improved engine unit further comprising:

(a) at least one separating aperture between the cylinder and a separation chamber, the separation chamber being connectable to the intake manifold and to the exhaust manifold respectively by the intake and exhaust apertures;

(b) at least one separating valve adapted for controlling closing and opening said separating aperture;

(c) one or more sensors located in said separating chamber, for delivering indications of the engine unit operational parameters to a control means effecting operation of at least one of the intake valve and the exhaust valve; and (d) at least one of said one or more sensors being selected from a group of sensors consisting of a temperature meter, a gas sensor and a pressure sensor, whereby opening both said separating valve and the exhaust valve enables gas flow from the cylinder volume to the exhaust manifold through the open separating aperture, the separation chamber and the exhaust aperture, and opening both said separating valve and the intake valve enables gas flow from the intake manifold to the cylinder volume through the open intake aperture, said separation chamber and the open separating aperture.

2. The improved engine of claim 1 wherein at least one valve of the intake valve and the exhaust valve is driven by a solenoid.

3. The improved engine unit of claim 1 wherein said at least one separating valve is driven by a camshaft, said camshaft is associated to a crankshaft at a first ratio of camshaft rotations to crankshaft rotations, said camshaft is adapted for providing a second ratio of separating valve openings to camshaft rotations.

4. The improved engine unit of claim 3 wherein a pulley system associates said camshaft to said crankshaft such that said first ratio is one of 1:4 and 1:3.

5. The improved engine unit of claim 4 , wherein said second ratio is one of 2:1 and 1:1.

6. The improved engine unit of claim 1 wherein the ratio of the volume of said separation chamber to full cylinder volume is in the range of 5-20%.

7. The improved engine unit of claim 1 wherein the pressure in said separation chamber during intake stroke is kept below 0.25 bar.

8. The improved engine unit of claim 1 wherein a control of said intake valve is adapted to change opening time of said intake valve in conjunction with the separating valve for keeping the amount of air entering the cylinder at a desired value.

9. The improved engine unit of claim 1 wherein the diameter of said separating valve is in the range of 65-95% of internal diameter of said cylinder.

10. The improved engine unit of claim 1 wherein the diameter of said separating valve is in the range of 70-85% of internal diameter of said cylinder.

11. The improved engine unit of claim 1 wherein the engine has at least two separating apertures and at least two respective separating valves.

12. The improved engine unit of claim 1 wherein the separating valve is substantially open since the exhaust valve opens until the intake valve closes.

* * * * *